Dec. 2, 1969  M. G. KURTH  3,481,210
STEPLESS VARIABLE SPEED TRANSMISSION
Filed Aug. 7, 1968  4 Sheets-Sheet 3
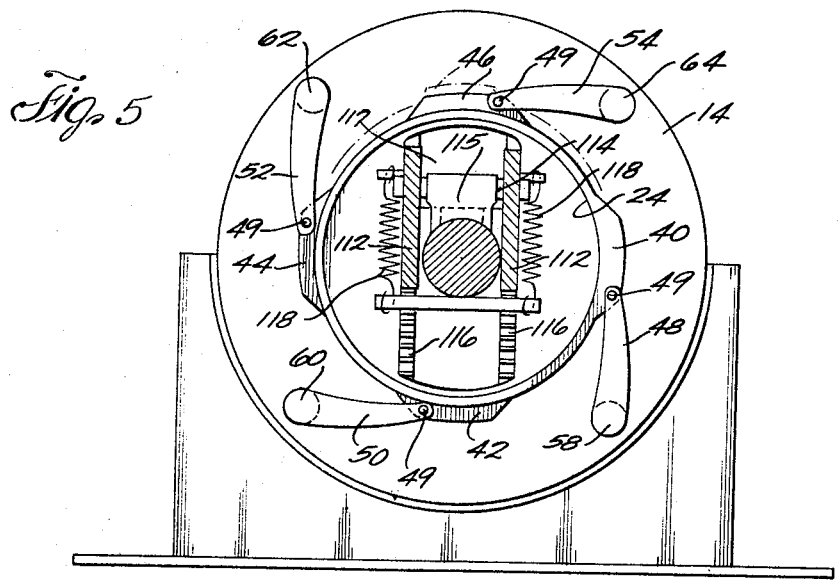
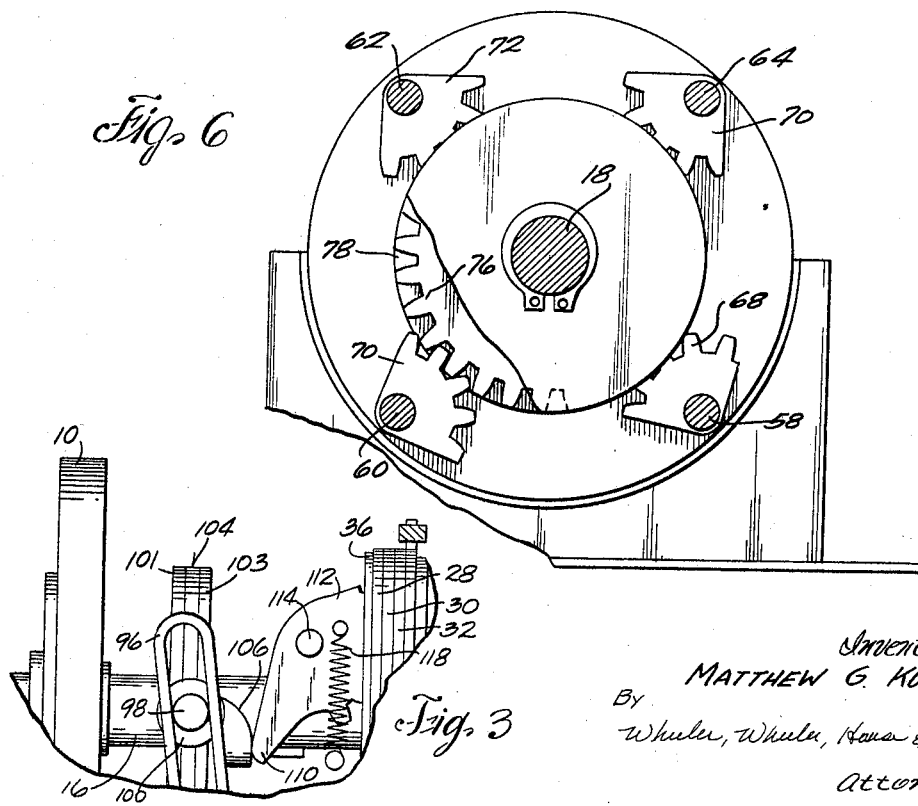
Inventor
MATTHEW G. KURTH
By
Wheeler, Wheeler, House & Clemency
Attorneys.

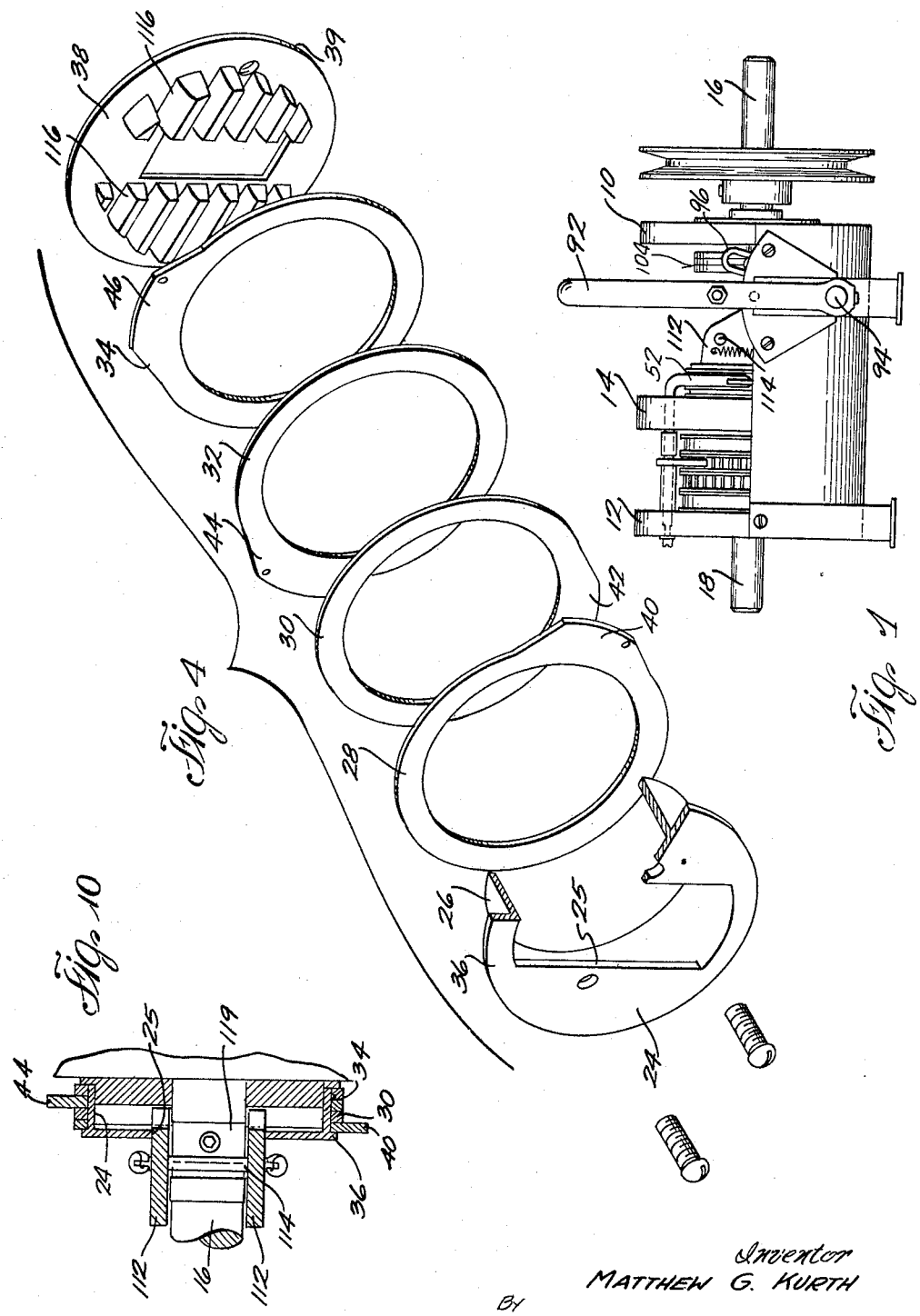

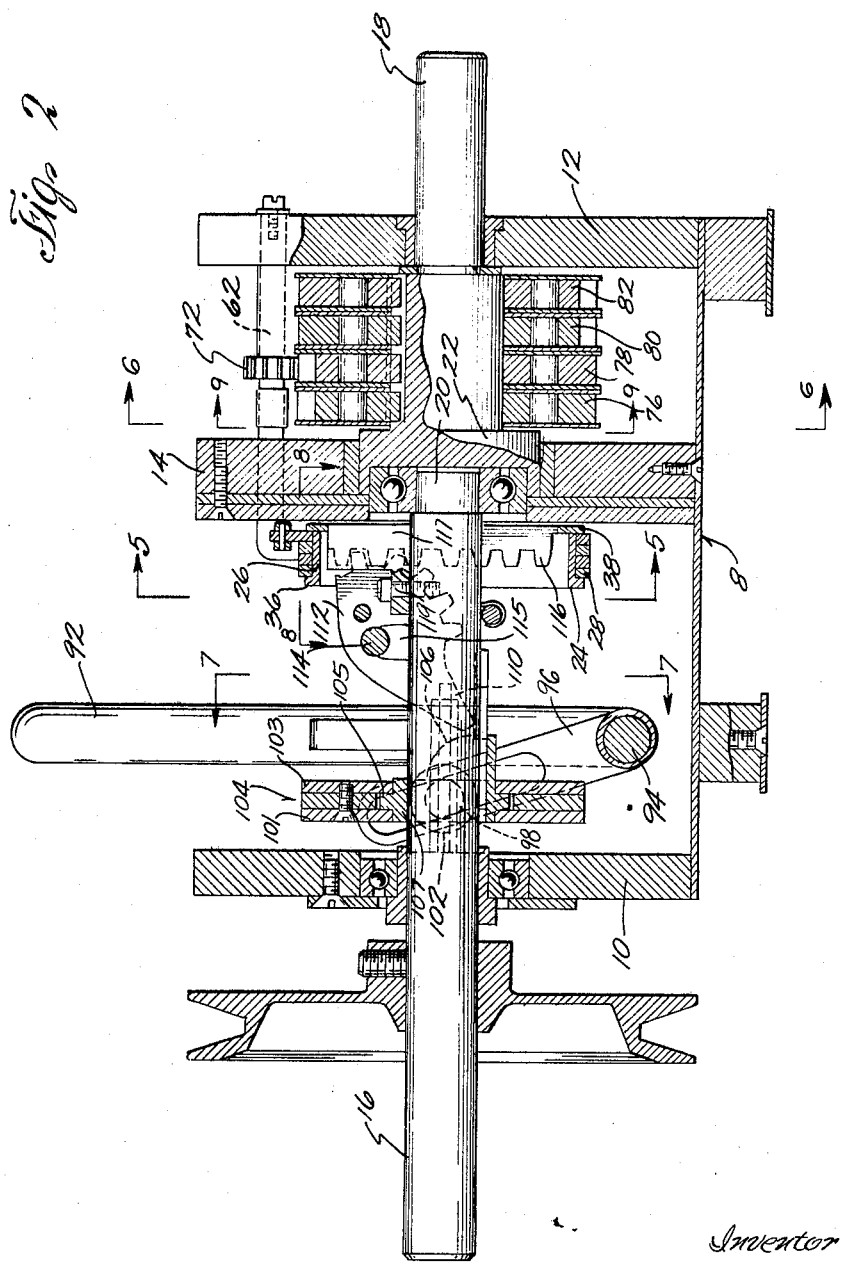

Dec. 2, 1969 M. G. KURTH 3,481,210
STEPLESS VARIABLE SPEED TRANSMISSION
Filed Aug. 7, 1968 4 Sheets-Sheet 4
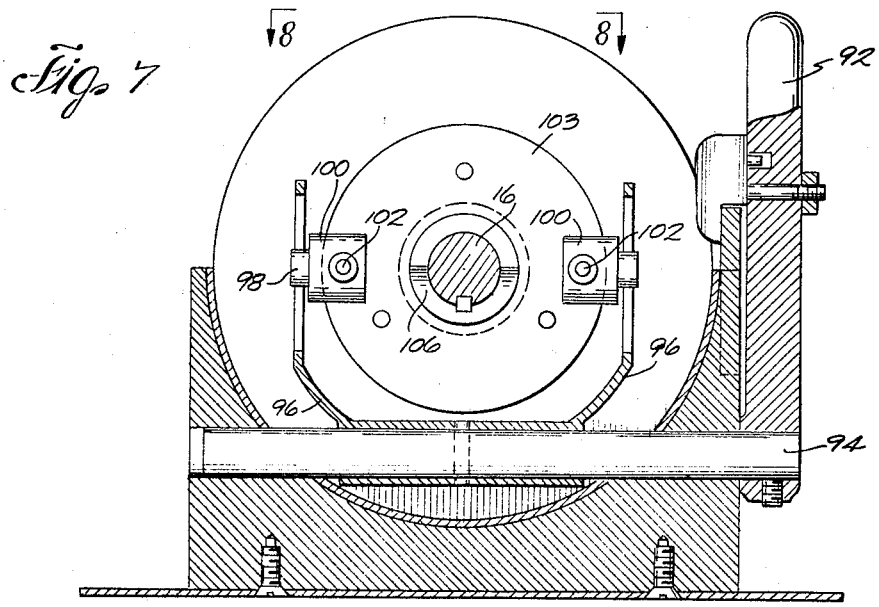
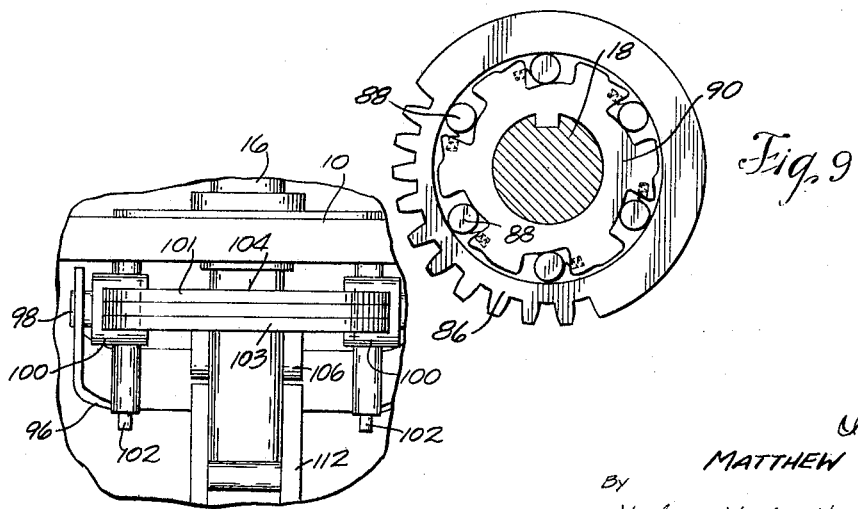
INVENTOR
MATTHEW G. KURTH
BY
Whales, Whales, House & Clemency
ATTORNEYS United States Patent Office 3,481,210
Patented Dec. 2, 1969

3,481,210
STEPLESS VARIABLE SPEED TRANSMISSION
Matthew G. Kurth, 2527 N. 38th St.,
Milwaukee, Wis. 53206
Continuation-in-part of application Ser. No. 573,672,
Aug. 19, 1966. This application Aug. 7, 1968, Ser.
No. 750,799
Int. Cl. F16h 29/08
U.S. Cl. 74—119                                    5 Claims

ABSTRACT OF THE DISCLOSURE

Driving and driven shafts are aligned, one preferably being piloted within the other. An eccentric carried by the driving shaft has means for varying its radius of eccentricity during continued rotation of the driving shaft.

Links which restrain the eccentric strap from rotation, while accommodating its orbital movement are connected to any desired number of rock shafts distributed about the periphery of driven segmental gears which are driven by toothed segments connected with the rock shafts. Each of the driven gears has a one-way clutch for the transmission of motion to the driven shaft.

CROSS REFERENCE TO RELATED APPLICATION

This application is a continuation-in-part of U.S. patent application Ser. No. 573,672, filed Aug. 19, 1966, now abandoned.

BACKGROUND OF INVENTION

The construction herein disclosed is inherently very strong as compared with stepless transmissions commonly used. Not only do the commonly used stepless transmissions require that the driving and driven parts be offset laterally rather than aligned, but the variation in speed results from a change in location of the fulcrums of the respective rock shafts. Since these are clustered together at one side of the apparatus, as in Patent 3,224,284, each of the rocker arms must be relatively light in weight because of space limitations. By disposing the rock shafts in annular series around the driven shaft, I am able to make the transmission as heavy as may be desired and thus to transmit very substantial torque while still maintaining the apparatus within modest dimensions.

DESCRIPTION OF THE DRAWINGS

FIG. 1 is a view in side elevation of apparatus embodying the invention.

FIG. 2 is an enlarged detail view of the apparatus in longitudinal section, portions being broken away.

FIG. 3 is a fragmentary detail view in side elevation showing in different positions some of the parts illustrated in FIG. 2.

FIG. 4 is an "exploded" view showing various parts in mutually separated positions including particularly separate plates which serve as straps for the respective links.

FIG. 5 is a view in cross section taken on the line 5—5 of FIG. 2.

FIG. 6 is a view in cross section taken on the line 6—6 of FIG. 2.

FIG. 7 is a view in cross section taken on the line 7—7 of FIG. 2.

FIG. 8 is a fragmentary plan view looking down on the structure of FIG. 7 from the point of view indicated at 8—8 in FIG. 7.

FIG. 9 is a view in cross section taken on the line 9—9 of FIG. 2.

FIG. 10 is a view in cross section taken on the line 10—10 of FIG. 2.

DETAILED DESCRIPTION

A relatively heavy frame 8 has end walls 10 and 12 and an intervening partition 14. In the end walls and partition, bearings are provided for a driving shaft 16 and a driven shaft 18. The driving shaft preferably has its end 20 piloted in the enlarged bearing disk 22 at the end of driven shaft 18.

Reciprocable diametrically of driving shaft 16 is a drum 24 having diametrical slot 25 for shaft 16 and also having a channeled periphery 26 as best shown in FIGS. 2 and 3. Means later described permits adjustment of eccentricity. Bearing on the periphery of the eccentric is a set of rings serving as individual straps and to which orbital movement is imparted by the eccentric (when the latter is not centered). The eccentric strap rings 28, 30, 32 and 34 are confined between the flanges 36 at one end of the eccentric and a removable plate 38, the margin 39 of which provides a similar flange at the other end. The several rings have ears 40, 42, 44 and 46 respectively which are apertured to receive pins 49 to connect with the rings the respective links 48, 50, 52 and 54.

These links not only restrain the straps against rotation with drum 24 but also connect the straps or rings with rock shafts 58, 60, 62 and 64 respectively. The gear segments 68, 70, 72 and 74 on the respective rock shafts mesh respectively with the toothed segments 76, 78, 80 and 82 of identical driving rings 86 of overrunning clutches which comprise rollers 88 and driven members 90, the latter being keyed to the driven shaft 18. A detail of one of the clutches is shown in FIG. 9.

In the rotation of the driving shaft when the eccentric drum 24 is off center, the eccentric 24 imparts orbital movement to the eccentric straps thereby causing oscillation of the rock shafts 58-64 and corresponding oscillation of the driving rings 86 of the several clutches on the driven shaft. The range of oscillation increases from zero (when the cam member 24 is concentric) to a maximum proportioned to the extent of eccentricity. In one direction of oscillation, each clutch imparts motion to the driven shaft. It will be apparent that as each successive clutch approaches its position of maximum oscillation and thereby ceases to deliver torque to the driven shaft, the next successive clutch picks up the torque so that the driven shaft continues in rotation at a rate which is materially less than the rate of rotation of the driving shaft.

The relative rate of rotation of the driven shaft can be varied by varying the eccentricity of eccentric 24 with respect to the axis of the driving shaft. This is done by using the lever 92 to oscillate its supporting rock shaft 94. Arms 96 on the rock shaft are slotted to receive the pins 98 which project laterally from shifting fork members 100 slideable along guide arms 102 (FIG. 6). The bifurcated shifting members 100 engage the periphery of a composite thrust disk 104. As clearly shown in FIG. 2 and FIG. 3, inner and outer plates 101 and 103 engage a peripheral flange 105 of an inner ring 107 splined to the drive shaft 16 provided with projections 106 bearing against the respective arms 110 of gear segments 112. These gear segments rotate with the drive shaft 16 being mounted on a transverse supporting shaft 114 carried in a boss 115 welded to shaft 16 (FIG. 2 and FIG. 5) and mesh with the heavy rack teeth 116 which are carried by the plate 38 and located at both sides of drive shaft 16 (FIGS. 4 and 5). The gear segments extend through slot 25 and bear against the margins thereof to constrain the eccentric drum 24 to rotate with the shaft and to guide it for diametrical adjustment to vary its eccentricity.

The plate 117 is mounted by means of bolt 119 on the drive shaft 16 and it provides lateral support for the segments 112 in the performance of their function of effecting and guiding the reciprocation of the eccentric drum 24 (FIG. 8). Springs 118 bias the eccentric toward a centered or neutral position (as shown in full lines in FIG. 5) in which no motion is transmitted to the driven shaft.

By oscillation of the control lever on its rock shaft 94, the radius of eccentricity can be increased against the bias of the spring, thereby effecting progressively greater range of oscillation of the links 48–54 and the rock shafts 58–64 and the gear segments 72 and the overrunning clutch driving rings 86 and driven rings 90. Thus the movement of the control lever 92 to the right as viewed in FIG. 2 will progressively increase markedly the rate of motion transmitted to the driven shaft as compared with the rate of rotation of the driving shaft. FIG. 5 shows the drum 24 in an eccentric position and FIGS. 3 and 4 show the drum in an eccentric.

It will be understood, of course, that in all adjustments of the device a great reduction in rate of motion is effected. However, the range of adjustment and the amount of power that can be transmitted within a device of given dimensions is believed to be far superior in the instant device to that of other mechanisms of the purpose.

What is claimed is:

1. A stepless variable speed reduction drive mechanism which comprises a driving shaft, a driven shaft, an eccentric having means mounting it for diametrical movement for change of radius with regard to the driving shaft, while coupled for rotation therewith, eccentric strap means mounted peripherally on the eccentric, link means connected with the said strap means for securing the strap means against rotation while accommodating orbital movement thereof about the driving shaft, and means with which the respective links are connected and including overrunning clutch means for translating such orbital movement into torque and delivering such torque to the driven shaft, a control lever, and means for transmitting motion from the control lever for the adjustment of the eccentric diametrically of the driving shaft, the driving shaft having means guiding the eccentric for such adjustment, the eccentric comprising a slotted drum provided with diametrical rack teeth at opposite sides, the means for transmitting motion from the control lever thereto comprising a pair of gear segments disposed at opposite sides of the driving shaft and having means mounting them from the driving shaft and having teeth meshing with the rack teeth of said drum, said drum being slotted and having margins engaged with the segments to receive rotative motion from the driving shaft, said control lever having a thrust member connected therewith for movement along said shaft in engagement with actuating arms with which the respective segments are provided.

2. A stepless variable speed reduction drive mechanism which comprises a driving shaft, a driven shaft, an eccentric having means mounting it for diametrical movement for change of radius with regard to the driving shaft, while coupled for rotation therewith, eccenrtic strap means mounted peripherally on the eccentric, link means connected with the said strap means for securing the strap means against rotation while accommodating orbital movement thereof about the driving shaft, and means with which the respective links are connected and including overrunning clutch means for translating such orbital movement into torque and delivering such torque to the driven shaft, the eccentric strap means comprising a series of disks individually connected to respective rock shafts, the eccentric having flange means confining the several disks in axial series on its periphery.

3. A mechanism according to claim 2 in which each of said rock shafts has a gear segment, each of the said overrunning clutches including a driving element having a gear segment meshing with a rock shaft gear segment.

4. A stepless variable speed transmission mechanism including axially aligned driving and driven shafts, means providing bearings on said shafts, a plurality of overrunning clutches having driven parts mounted on the driven shaft and having driving parts encircling the driven parts and provided with one-way clutch means thereto, each of said driving parts being provided peripherally with a gear segment, a plurality of circumferentially spaced rock shafts having gear segments each respectively meshing with one of the gear segments of an overrunning-clutch-driving-part, means providing bearings for the rock shafts, an eccentric mounted on the driving shaft and connected for rotation therewith, means for adjusting the eccentricity of said eccentric, and eccentric strap means bearing on the eccentric and operatively connected with the said rock shafts for the oscillation thereof for transmitting motion through the overrunning clutch means to the driven shaft.

5. A mechanism according to claim 4 in which the said eccentric has rack teeth at opposite sides of the driving shaft, the driving shaft having a rocker arm connected with it and provided with segments meshing with said rack teeth, said segments and said eccentric having interacting portions providing driving connection between the drive shaft and the eccentric in various positions to which the eccentric is adjustable by oscillation of the segments, means including a thrust member movable longitudinally of the drive shaft for oscillating said segments to vary the eccentricity of the eccentric with respect to the driving shaft, and a control lever operatively connected with said thrust member for the movement thereof.

References Cited

UNITED STATES PATENTS

| | | | |
|---|---|---|---|
| 2,706,914 | 4/1955 | Spence | 74—119 |
| 2,983,154 | 5/1961 | Neukirch | 74—119 |
| 3,224,284 | 12/1965 | McElheny et al. | 74—119 |
| 3,340,743 | 9/1967 | Stageberg | 74—116 |

FRED C. MATTERN, Jr., Primary Examiner

W. S. RATLIFF, Jr., Assistant Examiner